(12) United States Patent
Cook

(10) Patent No.: US 6,700,699 B1
(45) Date of Patent: Mar. 2, 2004

(54) DUAL COLOR ANTI-REFLECTION COATING

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/319,266

(22) Filed: Dec. 13, 2002

(51) Int. Cl.[7] .................................................. G02B 5/20
(52) U.S. Cl. ...................... 359/359; 359/360; 359/350; 359/361
(58) Field of Search ................................ 359/359, 360, 359/361, 582, 580, 581, 350; 428/696, 699, 697, 689, 701, 908.8

(56) References Cited

U.S. PATENT DOCUMENTS

| 3,432,225 | A | * | 3/1969 | Rock | 359/588 |
| 4,907,846 | A | * | 3/1990 | Tustison et al. | 359/359 |
| 4,995,684 | A | * | 2/1991 | Tustison et al. | 359/359 |
| 4,997,241 | A | * | 3/1991 | Muratomi | 359/589 |
| 5,472,787 | A | * | 12/1995 | Johnson et al. | 428/448 |
| 5,981,950 | A | * | 11/1999 | Wolny et al. | 250/338.4 |
| 6,266,193 | B1 | * | 7/2001 | Saif et al. | 359/582 |
| 6,538,714 | B1 | * | 3/2003 | Sahouani et al. | 349/194 |

FOREIGN PATENT DOCUMENTS

GB  2192733 A  *  1/1988  ............ G02B/1/10

* cited by examiner

Primary Examiner—Mohammad Sikder
(74) Attorney, Agent, or Firm—John E. Gunther; Colin M. Raufer; Glenn H. Lenzen, Jr.

(57) ABSTRACT

A multi-layer anti-reflection coating for simultaneously coupling electromagnetic radiation of two different wavelengths, $\lambda_1$ and $\lambda_2$, where $\lambda_1$ is greater than $\lambda_2$, from a first region into a second region is provided. The first region has an index of refraction that is smaller than that of the second region. The anti-reflection coating comprises three layers: (a) a first layer and a third layer that are essentially invisible to $\lambda_1$ and serve to reduce Fresnel losses for $\lambda_2$ and (b) a second layer sandwiched between the first and third layers that serves to reduce Fresnel losses for $\lambda_1$. The thickness and the index of refraction are calculated for each layer.

13 Claims, 1 Drawing Sheet

DUAL COLOR ANTI-REFLECTION COATING

TECHNICAL FIELD

The present invention relates generally to anti-reflection coatings for optical elements that transmit electromagnetic radiation in two different wavelength regions, e.g., in both the millimeter (mm) region and the long wave infrared (LWIR) region.

BACKGROUND ART

When designing optical systems for simultaneous use in the mm-wave (~3 mm) and LWIR (~10 $\mu$m) spectral regions that employ refractive materials, it is necessary to suppress Fresnel reflection losses at the interfaces of high refractive index regions. Since optimum materials (particularly for immersion lens applications) have refractive indices that are often greater than 3 or 4, these Fresnel losses can be very high (approaching 40% per surface) if anti-reflection coatings are not used. The present invention provides for a dual-color, mm-wave and LWIR, anti-reflection coating that is simple, practical, low cost and high performance.

Antireflection coatings for both mm-wave and LWIR separately are well known. Individually, these may take the form of dielectric layers or surface micro-structures (such as crossed grating structures.) Only recently has the idea of combining both simultaneously in a single sensor been raised, largely based on the attempts to develop two-level, micro-structure and macro-structure, micro-bolometer detector arrays. However, the present inventor is unaware of any prior art in the area of anti-reflection coatings for simultaneous mm-wave and LWIR imaging.

DISCLOSURE OF INVENTION

In accordance with the present invention, a multi-layer anti-reflection coating for simultaneously coupling electromagnetic radiation of two different wave-lengths, $\lambda_1$ and $\lambda_2$, where $\lambda_1$ is greater than $\lambda_2$, from a first region into a second region is provided. The multi-layer anti-reflection coating comprises:

(a) a first layer having a first thickness and a first index of refraction, a second layer having a second thickness and a second index of refraction, and a third layer having a third thickness and a third index of refraction, wherein the first layer is exposed to a first region having a fourth index of refraction and wherein the third layer is deposited on an optical element comprising the second region and having a fifth index of refraction;

(b) the first layer coupling the radiation from the first region into the second layer, the first layer having an optical thickness of $\lambda_2/4$;

(c) the second layer being positioned between the first and third layers, the second layer having a thickness greater than either of the first and the third layers, the second layer forming the anti-reflection coating for the radiation of $\lambda_1$ and coupling the radiation from the first region into a second region comprising the optical element, wherein the fourth index of refraction is smaller than the fifth index of refraction; and (d) the third layer coupling the radiation from the second layer into the second region, the third layer having an optical thickness of $\lambda_2/4$, the first layer and the third layer forming the anti-reflection coating for the radiation of $\lambda_2$.

Also in accordance with the invention, a method of reducing Fresnel surface losses for two widely separated wavelengths is provided. The method comprises forming the multi-layer anti-reflection coating on the optical element to provide the coated optical element by the process of:

(a) providing the optical element;
(b) forming the third layer on top of the optical element;
(c) forming the second layer on top of the third layer; and
(d) forming the first layer on top of the second layer.

The common use of immersion lenses makes the need for anti-reflection coatings very critical. The present invention is simple, low cost, and provides high throughput.

BRIEF DESCRIPTION OF THE DRAWINGS

The sole FIGURE depicts, in cross-section, the three-layer coating that acts as two anti-reflection coatings for both mm-wave and LWIR imaging.

BEST MODES FOR CARRYING OUT THE INVENTION

Figure 1:
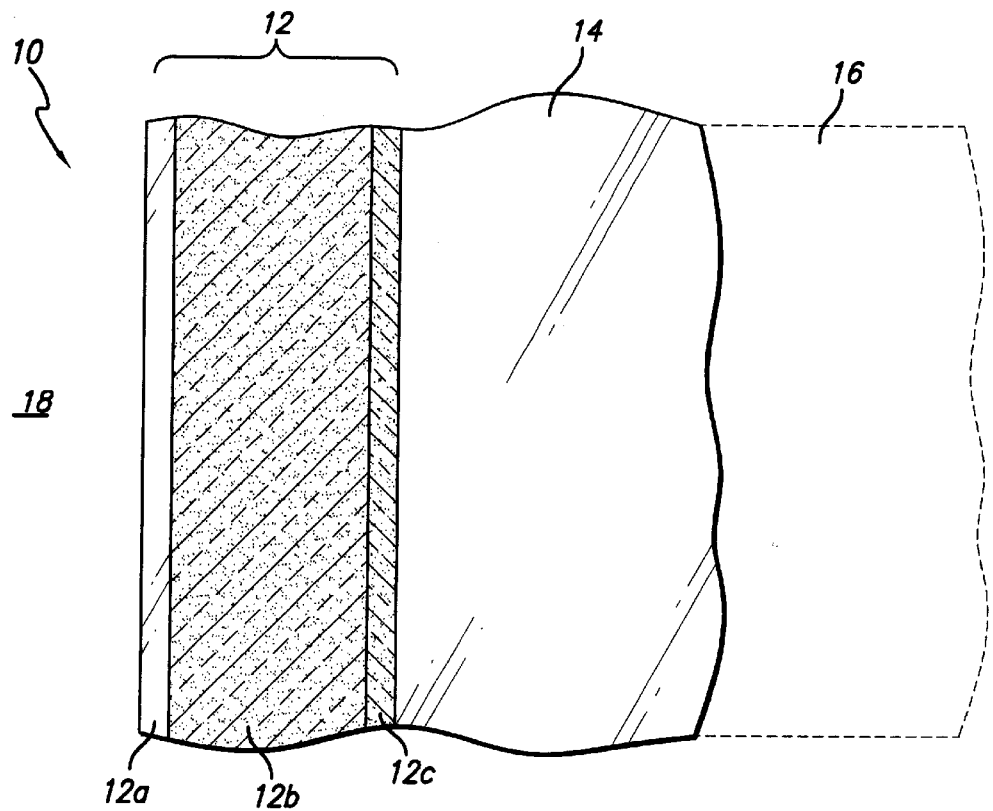

The following description is specifically directed to a dual-color anti-reflection coating for millimeter (mm) wave, specifically, 3 mm, and long wave infrared (LWIR), specifically, 10 $\mu$m, electromagnetic radiation incident on an optical element. However, based upon the teachings herein, it will be readily apparent to those skilled in this art that the principles of the present invention can be applied to other dual-color systems, so long as the two wavelengths are sufficiently widely separated, as discussed further below.

The present invention is based on a simple application of basic rules governing Fresnel surface losses, together with the realization that with a ratio of about 300 in wavelengths, mm-wave structures appear huge to 10 $\mu$m radiation, and 10 $\mu$m structures are essentially invisible to mm-wave radiation. The invention is a simple three-layer coating that provides for simultaneous low surface losses at mm-wave and LWIR imaging.

The sole FIGURE shows a coated optical element 10 comprising an anti-reflection coating 12 formed on the optical element 14, which may optionally be supported on a substrate 16. The three-layer anti-reflection (AR) coating 12 results in low Fresnel surface losses at wavelengths of 3 mm, denoted herein as $\lambda_1$, and 10 $\mu$m, denoted herein as $\lambda_2$. The anti-reflection coating 12 is used to couple electromagnetic radiation from a first region 18, e.g., air, into a second region 14, specifically, an optical element, optionally supported on the substrate 16. The electromagnetic radiation is of two quite different wavelengths, with $\lambda_1$ greater than $\lambda_2$.

The middle layer 12b is a relatively thick layer that functions as the AR coating for the millimeter-wave radiation ($\lambda_1$), coupling from a relatively low index region 18, e.g., n=1.0 region, into a relatively high index region (optical element 14), e.g., n=4.0 region. The thickness of the middle layer 12b has an optical thickness of $\lambda_1/4$ with an index equal to the square root of the product of the indices in the first and second regions 18, 14, as described more fully below.

The first and third layers 12a, 12c, respectively, are invisible to the millimeter-wave radiation because they are so thin relative to the millimeter wavelength $\lambda_1$, and, accordingly, function as the AR coating for the LWIR ($\lambda_2$). The first and third layers 12a, 12c follow the same formula (optical thickness of $\lambda_2/4$ with an index equal to the square root of the product of the indices in the preceding and succeeding media) forming the AR coatings for the 10 $\mu$m radiation, transitioning from the low index re-gion 18 to the region 12b and from the region 12b to the high index region 14, respectively.

The three-layer anti-reflection (AR) coating 12 is deposited on the optical element 14 (here, n=4, but could be almost any optical element from n=2 on up). This is an extended region, and is much larger than the three-layer AR coating 12. It is into this material that it is desired to introduce two different wavelengths, $\lambda_1$, for example in the mm-region (e.g., 3 mm) and $\lambda_2$, for example in the LWIR region (e.g., 10 μm). This material 14 could be an optical element or some part of a sensor for sensing the two wavelengths $\lambda_1$ and $\lambda_2$.

The first and third AR layers 12a, 12c are invisible to $\lambda_1$ (here, mm-wavelengths), but serve to reduce Fresnel losses for the LWIR. The middle layer 12b serves to reduce Fresnel losses for mm wavelengths. Essentially, there are two AR systems, one for mm (second AR layer 12b) and one for LWIR (first and third AR layers 12a, 12c).

As mentioned above, so long as the two incident wavelengths are sufficiently widely separated, the teachings of the present invention are useful for essentially any dual-color system. In this connection, the constraint imposed is that the longer wavelength does not "see" the first and third layers 12a, 12c; that is, the first and third layers are essentially invisible to the longer wavelength, here, mm wave-lengths. As a first approximation, the difference between the two wavelengths, sufficient to practice the teachings of the present invention, is a factor of approximately 16 (the longer wavelength being at least 16 times that of the shorter wavelength) for the simple three-layer AR system disclosed and claimed herein.

The following discussion is directed to how to calculate the thickness and index of refraction required for the three-layer AR coating 12 of the present invention. For a single AR system, in proceeding from a material having an index of refraction of $n_1$ to a material having an index of refraction of $n_2$, there would be a single AR coating layer $n_c$ having an index of refraction given by $$n_c = \sqrt{n_1 \times n_2}.$$

The physical thickness $t_c$ of the coating is then given by $$t_c \times n_c = \lambda/4.$$

Based on the foregoing, it can be seen that moving from region 18 of n=1 (e.g., air) to a region of n=2 (layer 12b), then n for the first layer 12a is 1.414. Similarly, moving from a region of n=2 (layer 12b) to region 14 of n=4 requires the third layer (12c) to have an index of refraction of n=2.828. Likewise, moving from a region of n=1.414 (layer 12a) to a region of n=2.828 (layer 12c) requires the second layer 12b to have an index of refraction of n=2.

The physical thickness of the three layers can be similarly calculated. For example, the first layer 12a, being invisible to mm (3 mm) but visible to LWIR (10 μm): $t_1 = \lambda_2/4 \div n_1 = 10/4$ divided by 1.414=1.77 μm. For the third layer 12c, also invisible to mm but visible to LWIR, $t_3 = \lambda_2/4 \div n_3 = 10/4$ divided by 2.828=0.88 μm. For the second layer 12b, visible to mm, $t_2 = \lambda_1/4 \div n_2 = 3/4$ divided by 2=0.375 mm.

The Table below summarizes the thicknesses and indices of refraction for the case of coupling two wavelengths, 3 mm and 10 μm, from air (the first region 18; n=1) into an optical element (the second region 14; n=4).

TABLE

Calculated thicknesses and refractive indices for incident wavelengths of 3 mm and 10 μm.

| Layer | Thickness | Refractive Index |
|---|---|---|
| first layer 12a | 1.77 μm | 1.414 |
| second layer 12b | 0.375 mm | 2 |
| third layer 12c | 0.88 μm | 2.828 |

Of course, those skilled in this art will appreciate that the materials used in the AR coatings 12a, 12b, 12c cannot have any significant absorption in the wavelength region of interest.

It may be difficult to find a material having the calculated index of refraction and thickness. It will be readily appreciated by those skilled in this art that a departure in index can be partially compensated by a departure in thickness, but there will be an increase in Fresnel losses. Such calculations for determining the change in thickness, based on a change in index of refraction are well known, and the only concern will be the increase in Fresnel losses and whether such increase can be tolerated.

Examples of materials useful for the various layers include, but are not limited to, the following:

(a) first region 18: air (n=1.0);

(b) layer 12a: materials selected from the group consisting of aluminum oxide (n=1.6), magnesium fluoride (n=1.4), and glasses and plastics having an index of refraction of approximately 1.4;

(c) layer 12b: materials selected from the group consisting of silver chloride (n=2.0) and thallium bromide-iodide (KRS-6) (n=2.3);

(d) layer 12c: materials selected from the group consisting of zinc selenide (n=2.4), zinc sulfide (n=2.2), and arsenic trisulfide (n=2.6); and (e) second region 14 (optical element): materials selected from the group consisting of germanium (n=4.0), silicon (n=3.4), and gallium arsenide (n=3.3).

The foregoing description is directed to layers having discrete boundaries. However, the teachings herein can also utilize Rugate-like coating deposition techniques, which provide transitional, or gradient, regions of refractive index from one layer to another.

INDUSTRIAL APPLICABILITY

The present invention is expected to find utility in anti-reflection coatings for sensors and other optical elements having incident thereon two different electromagnetic wavelengths, such as mm and LWIR.

What is claimed is:

1. A multi-layer anti-reflection coating for simultaneously coupling electromagnetic radiation of two different wavelengths, $\lambda_1$ and $\lambda_2$, where $\lambda_1$ is greater than $\lambda_2$, from a first region into an optical element, the multi-layer anti-reflection coating comprising:

(a) a first layer having a first thickness and a first index of refraction, a second layer having a second thickness and a second index of refraction, and a third layer having a third thickness and a third index of refraction, wherein the first layer is exposed to a first region having a fourth index of refraction and wherein the third layer is formed on the optical element having a fifth index of refraction;

(b) the first layer coupling the radiation from the first region into the second layer, the first layer having an optical thickness of $\lambda_2/4$;

(c) the second layer positioned between the first and third layers, the second layer having a thickness greater than either of the first and the third layers, the second layer forming the anti-reflection coating for the radiation of $\lambda_1$ and coupling the radiation from the first region into a second region comprising the optical element, wherein the fourth index of refraction is smaller than the fifth index of refraction; and (d) the third layer coupling the radiation from the second layer into the second region, the third layer having an optical thickness of $\lambda_2/4$, the first layer and the third layer forming the anti-reflection coating for the radiation of $\lambda_2$.

2. The anti-reflection coating of claim 1 wherein the first wavelength is sufficiently widely separated from the second wavelength that the first and third layers are essentially invisible to the first wavelength.

3. The anti-reflection coating of claim 2 wherein the first wavelength is approximately 16 times, or more, the value of the second wavelength.

4. The anti-reflection coating of claim 1 wherein $\lambda_1$ is in the mm-wave region of the electromagnetic spectrum and wherein $\lambda_2$ is in the long wave infra-red region of the electromagnetic spectrum.

5. The anti-reflection coating of claim 4 wherein $\lambda_1$ is about 3 mm and wherein $\lambda_2$ is about 10 $\mu$m.

6. The anti-reflection coating of claim 5 wherein the first region has an index of refraction of approximately 1.0 and the optical element has an index of refraction of approximately 4.0.

7. The anti-reflection coating of claim 6 wherein the physical thickness of the first layer is approximately 1.77 $\mu$m, wherein the physical thickness of the second layer is approximately 0.375 millimeters, and wherein the physical thickness of the third layer is approximately 0.88 $\mu$m.

8. The anti-reflection coating of claim 7 wherein the first layer has an index of refraction of approximately 1.414, wherein the second layer has an index of refraction of approximately 2.0, and wherein the third layer has an index of refraction of approximately 2.828.

9. A multi-layer anti-reflection coating for simultaneously coupling electromagnetic radiation of two different wavelengths from a first region into an optical element, the two wavelengths comprising a first wavelength $\lambda_1$ in the mm-wave region of the electromagnetic spectrum and a second wavelength $\lambda_2$ in the long wave infrared region of the electromagnetic spectrum, the multi-layer anti-reflection coating comprising:

(a) a first layer having a first thickness and a first index of refraction, a second layer having a second thickness and a second index of refraction, and a third layer having a third thickness and a third index of refraction, wherein the first layer is exposed to a first region having a fourth index of refraction and wherein the third layer is deposited on the optical element having a fifth index of refraction;

(b) the first layer coupling the radiation from the first region into the second layer, the first layer having an optical thickness of $\lambda_2/4$;

(c) the second layer positioned between the first and third layers, the second layer having an optical thickness of $\lambda_1/4$, the second layer forming the anti-reflection coating for the radiation of $\lambda_1$ and coupling the radiation from the first region into a second region comprising the optical element, wherein the fourth index of refraction is smaller than the fifth index of refraction; and (d) the third layer coupling the radiation from the second layer into the second region, the third layer having an optical thickness of $\lambda_2/4$, the first layer and the third layer forming the anti-reflection coating for the radiation of $\lambda_2$.

10. The anti-reflection coating of claim 9 wherein $\lambda_1=3$ mm and $\lambda_2=10$ $\mu$m.

11. The anti-reflection coating of claim 10 wherein the first region has an index of refraction of approximately 1.0 and the optical element has an index of refraction of approximately 4.0.

12. The anti-reflection coating of claim 11 wherein the physical thickness of the first layer is approximately 1.77 micrometers, wherein the physical thickness of the second layer is approximately 0.375 millimeters, and wherein the physical thickness of the third layer is approximately 0.88 micrometers.

13. The anti-reflection coating of claim 12 wherein the first layer has an index of refraction of approximately 1.414, wherein the second layer has an index of refraction of approximately 2.0, and wherein the third layer has an index of refraction of approximately 2.828.

* * * * *